United States Patent [19]

Rauterkus et al.

[11] Patent Number: 5,093,414

[45] Date of Patent: Mar. 3, 1992

[54] DISPERSION POLYMERS BASED ON ETHYLENICALLY UNSATURATED MONOMERS AND CONTAINING URETHANE GROUPS, PROCESS FOR THEIR PREPARATION AND THEIR USE

[75] Inventors: Karl J. Rauterkus, Kelkheim; Hans-Ullrich Huth, Egelsbach; Karl-Hans Angelmayer, Eltville, all of Fed. Rep. of Germany

[73] Assignee: Hoechst Aktiengesellschaft, Fed. Rep. of Germany

[21] Appl. No.: 707,633

[22] Filed: May 30, 1991

Related U.S. Application Data

[63] Continuation of Ser. No. 268,776, Nov. 8, 1988, abandoned.

[30] Foreign Application Priority Data

Nov. 10, 1987 [DE] Fed. Rep. of Germany ....... 3738140

[51] Int. Cl.$^5$ .......................... C08L 33/14; C08F 26/02
[52] U.S. Cl. ...................................... 524/813; 526/301
[58] Field of Search .......................... 524/813; 526/307

[56] References Cited

U.S. PATENT DOCUMENTS

| 3,536,525 | 10/1970 | Kolb ................................. 526/307 |
| 3,622,532 | 5/1969 | Kolb et al. ........................ 526/307 |
| 4,507,188 | 3/1985 | Chu ................................. 526/307 |

FOREIGN PATENT DOCUMENTS 1176479 1/1980 United Kingdom .

Primary Examiner—Joseph L. Schofer
Assistant Examiner—Jeffrey T. Smith
Attorney, Agent, or Firm—Bierman and Muserlian

[57] ABSTRACT

The preparation of dispersion polymers based on ethylenically unsaturated monomers and containing at least 1% by weight of specific monomer units comprising esters or amides of ethylenically unsaturated carboxylic acids which are capable of (co)polymerization and contain urethane groups in the ester or amide radicals, by emulsion, suspension or bead polymerization or copolymerization initiated by means of free radicals, and the use thereof, if appropriate in aqueous dispersion form, as coating agents, adhesives, molded plastics and as binders, thickeners and auxiliaries in industrial chemical preparations.

5 Claims, No Drawings

DISPERSION POLYMERS BASED ON ETHYLENICALLY UNSATURATED MONOMERS AND CONTAINING URETHANE GROUPS, PROCESS FOR THEIR PREPARATION AND THEIR USE

PRIOR APPLICATION

This application is a continuation of U.S. patent application Ser. No. 268,776 filed Nov. 8, 1988, now abandoned.

The invention relates to dispersion polymers based on ethylenically unsaturated monomers and containing units of esters or amides of ethylenically unsaturated carboxylic acids which are capable of (co)polymerization and have urethane groups in the ester or amide radicals, process for their preparation by emulsion, suspension or bead polymerization or copolymerization initiated by the radicals, and their use as coating agents, adhesives, molded plastics and as binders and auxiliaries in industrial chemical preparations.

Polymers which contain urethane groups are already known and are usually prepared by polyaddition from (poly)isocyanates and monofunctional or polyfunctional hydroxyl compounds, ethylenically unsaturated monomers containing OH groups, polyols or prepolymers. The products resulting in this case with formation of urethane groups are polymers whose urethane groups are known to be a component of the main polymer chains. The polyaddition reactions are usually carried out in the solid phase or, preferably, in inert organic solvents. Polyaddition in inert solvents has the advantage, inter alia, of easier conduction of the reaction and simpler dissipation of the heated reaction and, in addition, simplifies later formulation of the polymers into surface coatings or adhesives containing solvents. In contrast, it is known that the use of these addition polyurethanes in aqueous systems, for example as aqueous dispersions or as aqueous dispersions or as aqueous surface coatings, requires complex measures in order, for example, to initially dissolve the polymer in an organic solvent in the necessary concentration, to convert the solution into an aqueous form or to disperse the solution in an aqueous medium and subsequently to effect stabilization, and subsequently to remove the organic solvent again from the aqueous system.

The urethane groups present in the polymer chains of the polyurethanes may exert strong interactions within the polymer chains, which, as is known, favors, inter alia, their suitability for use as water- and chemical-resistant coatings, binders, fibers and moldings. The very good adhesion of polyurethanes to a very wide variety of substrates due to strong polar interactions with these substrates, particularly to metals and in particular to iron, a good corrosion-protection action, inter alia, also resulting on iron, should also be emphasized here. Polyurethanes are therefore very highly suitable as surface coatings, for example for automobile bodies, where they can result in durable, high-gloss, hard and solvent-resistant coatings.

Ethylenically unsaturated compounds which are capable of polymerization and already contain, in their monomeric form, urethane groups in the molecule have hitherto only been disclosed in limited number. Some of the known ethylenically unsaturated monomeric urethanes which still have at least one free isocyanate group are employed in their monomeric form or also already in polymerized or copolymerized form via their ethylenically unsaturated radical, as latent crosslinking agents, i.e. those which are blocked at the free isocyanate group, in curable surface coatings and coating compositions, where they result in curing of the binder at elevated temperatures through reaction with functional groups of the coating resin.

Thus, for example, an ethylenically unsaturated monomeric compound of the formula (1)

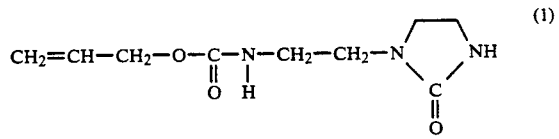

containing urethane groups which is commercially available under the name WAM+)-IV-TM is employed as a comonomer in the preparation of customary plastic dispersions by emulsion polymerization and is said to provide the resultant copolymer dispersions with improved wet adhesion to alkyd resin substrates when the dispersions are used as binders in dispersion coatings.
+)WAM=Wet Adhesion Monomer European Patent 21,015 discloses the preparation of copolymeric binder for electrocoating which contains, as a comonomer for later crosslinking at elevated temperatures, a blocked vinyl or propenyl isocyanate of the formula (2)

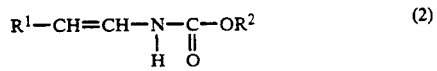

in which $R^1$ denotes H or —$CH_3$ and $R^2$ denotes —$C_6H_{12}$, —$C(CH_3)_3$ or

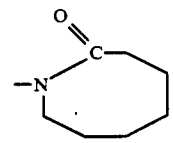

in copolymerized form. The publication does not mention the properties of the uncrosslinked copolymeric binder with respect to its adhesion to substrates and its weathering resistance.

Monomers of the (meth)acrylate type containing urethane radicals, of the formula (3)

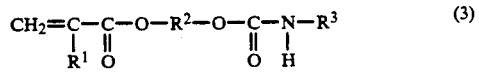

in which $R^1$ denotes H or —$CH_3$, $R^2$ denotes alkylene and $R^3$ denotes alkyl, are known from U.S. Pat. No. 3,479,328. Their synthesis proceeds from (meth)acrylates, which are reacted with epoxy compounds or diols to form hydroxyesters. Subsequent reaction with phosgene and amines or with urea results in compounds of the formula (3), which can be copolymerized in solution by means of free radicals with other monomers, such as, for example, vinyl esters, customary (meth)acrylates and vinyl aromatic compounds.

In addition, European Patent 147,172 discloses monomeric urethane of the formula (3) as reactive thinners in radiation crosslinkable coatings, where they are said to resort in more advantageous results than, for example, vinylpyrrolidone in that, on the one hand, they render the oligomeric starting resin less viscous and, on the other hand, they result in better elongation and tensile strength values in the cured coating.

In addition, Japanese Patent 56-45,966 discloses copolymers, some of which contain monomer units having urethane groups. They are obtained by copolymerization of vinyl esters of drying and semi-drying oil fatty acids, (meth)acrylates, vinyl aromatic compounds, inter alia, with products of the reaction of hydroxyethyl (meth)acrylates and mono- or diisocyanates as well as 3 to 40% by weight of unsaturated carboxylic acids in organic solvents. By removing the solvent by distillation after the polymerization and neutralization of the carboxyl groups, the resin can be rendered water-soluble or water-dispersible and, with addition of organic heavy-metal salts (siccatives), the resin can be cured oxidatively at elevated temperature to form coatings having a tack-free surface.

Japanese Patent 58-98,302 discloses the use of (meth)acrylates of urethanes, the urethanes not being characterized in greater detail, in the production of inorganic-organic heat-resistant compositions. The production of the resins described takes place here by polymerization of unsaturated compounds ((meth)acrylates, vinyl aromatic compounds) in water glass and subsequent curing of the water glass.

Isocyanatoethyl methacrylate of the formula (4)

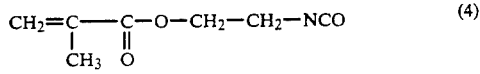

has already been disclosed and is an interesting functional monomer which can be homopolymerized or copolymerized in solution and, due to the isocyanate group, offers possibility of further reaction or crosslinking. By blocking the isocyanate group using suitable compounds, such as alcohols, diketo compounds, phenols, oximes or heterocyclic compounds, unsaturated derivatives, which are able to recleave and crosslink at relatively low temperatures (about 110° to 130° C.) after copolymerization, can be synthesized from the compound of the formula (4). The preparation and use of the binders described, i.e. the (co)polymerization (with other monomers), takes place exclusively in organic solvents and is virtually exclusively directed towards crosslinking of the binders at elevated temperatures.

Besides the use of unsaturated ureas, European Patent Offenlegungsschrift 197,635 discloses the preparation and use of macromers containing urethane groups and based on (meth)acrylates of the formula (5)

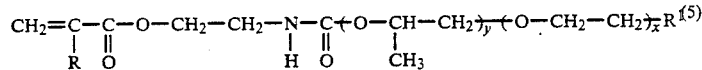

in which R denotes H or —$CH_3$, $R^1$ denotes alkoxy, alkylphenoxy, dialkylphenoxy inter alia, x denotes 1 to 150 and y denotes 0 to 50. According to this patent, monomers of the formula (5) can be copolymerized as comonomers to the extent of 1 to 25% by weight with 5 to 70% by weight of unsaturated carboxylic acids and further monomers (vinyl esters, (meth)acrylates, vinyl aromatic compounds), to produce, on emulsion copolymerization, thickener dispersions which, after adjustment to approximately pH 9, result in highly viscous aqueous solutions. The latter products are said to have better electrolyte stability and better hydrolysis stability, compared with the thickeners already known. European Offenlegungsschrift 197,635 does not describe the possible uses of monomers of the formula (5) in other fields of application.

The emulsion polymers containing urethane groups which have already been disclosed have crucial disadvantages. Thus, for example, monomeric urethanes of the formula (2) can only be copolymerized to an inadequate extent due to their allyl double bond, which means that their resultant low content in the copolymers can also only have a small effect on the properties of the copolymers. Accordingly, copolymers containing monomer units of the formula (2) only have an advantageous effect on the wet adhesion to alkyd resin substrates of dispersion coatings produced therefrom, but, in contrast, they have no effect at all with respect to corrosion protection on metals. Neither are the copolymers known from European Offenlegungsschrift 197,635 which contain monomer units of the formula (5) suitable for surface-coating of solid substrates, in particular for corrosion-protection on metals, since films of the dispersion copolymers described are excessively water-sensitive as a consequence of their high content of carboxyl groups.

The present invention thus had the object of overcoming the abovementioned disadvantages of the known copolymers contain urethane groups and of providing, in particular, polymers containing urethane groups which can preferably be prepared by customary emulsion polymerization and can then advantageously be used, without additional heat treatment, as coating agents, in particular for corrosion protection of metals, furthermore for the production of films, fibers, adhesives, surface coatings, compression molding compositions, moldings, as thickeners in liquid media, as impregnating agents for porous substrates and as auxiliaries in the leather, textiles, paper and building materials industries.

Surprisingly, it has now been found that the abovementioned difficulties can be overcome by using dispersion polymers which are based on ethylenically unsaturated monomers, have been prepared by suspension or emulsion polymerization and contain at least 1% by weight of monomer units comprising compounds of the formula (I)

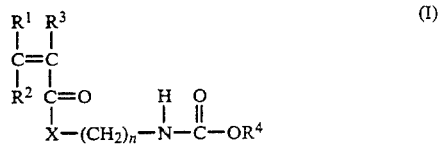

in which $R^1$ and $R^2$ may be identical or different and denote H or —$CH_3$, preferably $R^1=R^2=H$, $R^3$ denotes H or —$CH_3$, preferably —$CH_3$, X denotes O or NH, preferably O, $R^4$ denotes ($C_1$-$C_{22}$)-alkyl, ($C_5$-$C_7$)-cycloalkyl which is optionally substituted by ($C_1$-$C_{12}$)-alkyl radicals, ($C_6$-$C_{10}$)-aryl which is optionally substituted by ($C_1$-$C_{12}$)-alkyl radicals, preferably phenyl or naphthyl, aralkyl, having 7 to 24 carbon atoms, preferably benzyl, heterocyclic radicals which form S- or N-containing 5- or 6-membered rings and are optionally substituted by $(C_1-C_6)$-alkyl radicals, preferably heterocyclic radicals having 1 or 2 N atoms, a $\beta$-diketo radical, preferably the acetoacetyl radical, and n denotes a number from 2 to 4, preferably 2.

The invention therefore relates to dispersion polymers which are based on ethylenically unsaturated monomers and contain units of esters of ethylenically unsaturated carboxylic acids which are capable of (co)-polymerization and contain urethane groups in the ester radicals, and have been prepared by emulsion, suspension or bead polymerization or copolymerization, wherein they contain at least 1% by weight, preferably at least 2% by weight, in particular 4 to 100% by weight, of monomer units comprising compounds of the formula I, or aqueous dispersions of these dispersion polymers.

Preferred monomer units of this type are those comprising compounds of the formula I in which, in the formula I, $R^1=R^2=H$, $R^3$ denotes $-CH_3$, X denotes oxygen and n denotes 2. They may be prepared in a simple and known manner in their monomeric form corresponding to formula I by reacting isocyanatoethyl methacrylate and the appropriate alcohols or phenols in the solid phase, it also being possible, for better conduction of the reaction, to carry out the esterification in inert organic solvents or alternatively in so-called reactive thinners, i.e. monomers such as vinyl esters, (meth)acrylates, vinyl aromatic compounds and similar monomers, with which the copolymerization is later to be carried out.

In addition to monomer units comprising compounds of the formula I, copolymeric dispersion polymers according to the invention preferably contain comonomer units comprising the following monomers which are capable of copolymerization: vinyl esters of $(C_1-C_{18})$-carboxylic acids, in particular vinyl acetate, vinyl propionate, vinyl versatate and vinyl laurate; (meth)acrylates of $(C_1-C_{18})$-alcohols, in particular methyl methacrylate, butyl methacrylate, octyl methacrylate, ethyl acrylate, isobutyl acrylate and 2-ethylhexylacrylate; vinyl aromatic compounds having up to 18 carbon atoms, in particular styrene and vinyl toluene; vinyl chloride, ethylene, acrylonitrile, diesters of maleic acid and/or fumaric acid with $C_1-C_{18}$-alcohols, and vinyl pyrrolidone. One or more comonomer units may be present in the copolymeric dispersion polymers.

In the dispersion polymers, particular preference is given to comonomer units which are stable to hydrolysis in aqueous dispersions and are capable of forming stable copolymeric products. The proportion of comonomer units in the copolymeric dispersion polymers depends, both in respect of their nature and their amounts, on the applicational properties desired for the copolymeric final product, it being possible to use the selection criteria known to those skilled in the art in order to determine and adjust the proportions.

When the dispersion polymers according to the invention are used in the form of aqueous dispersions, their minimum film-formation temperature (MFT) should be below or in the region of the application temperature intended, i.e. preferably between 0° and 80° C., in particular between 0° and 40° C. If dispersion polymers with a harder formulation are used, customary film-formation auxiliaries or external plasticizers can be co-used in order to achieve the film-formation temperature necessary. If this is not desired, the MFT should particularly preferably be arranged between 0° and 25° C. The monomer unit combinations below are suitable as a component of copolymeric dispersion polymers in the context of the invention, in combination with monomer units comprising compounds of the formula I, for example very particularly in the weight ratios specified below (PW=parts by weight):

| | |
|---|---|
| Butyl acrylate/methyl methacrylate | 10–90 PW/90–10 PW |
| Butyl acrylate/styrene | 10–90 PW/90–10 PW |
| Octyl acrylate/methyl methacrylate | 5–80 PW/95–20 PW |
| Octyl acrylate/styrene | 5–80 PW/95–20 PW |
| Vinyl acetate/butyl acrylate | 40–80 PW/60–20 PW |
| Vinyl acetate/vinyl versatate | 50–80 PW/50–20 PW |

With respect to the property profile of the dispersion polymers to be used according to the invention, it may in some cases be advantageous for the dispersion polymers to contain, besides the abovementioned comonomer units, further comonomer units comprising ethylenically unsaturated monomers which are capable of copolymerization and contain functional radicals, preferably radicals from the group comprising $-OH$, $-SO_3H$ or salts thereof, $-N(R^5)_2$, $-N(R^6)_3$, $-COOH$ or salts thereof, $-CON(R^7)_2$ or epoxide. In these formulae, $R^5$ preferably denotes $(C_1-C_6)$-alkyl or H, $R^6$ preferably denotes $(C_1-C_{18})$-alkyl, $(C_7-C_{22})$-aralkyl, glycidyl, H, $(C_1-C_4)$-hydroxyalkyl or $(C_1-C_6)$-carboxyalkyl and $R^7$ preferably denotes $(C_1-C_6)$-alkyl, H, methylol, $(C_1-C_4)$-alkoxy, $(C_2-C_6)$-alkylsulfonic acid or salts thereof. Comonomer units of this type may preferably be present in the dispersion polymers in amounts from 0 to 19% by weight, in particular 0.1 to 5% by weight, based on the dispersion polymer, and preferably comprise units of, for example, the following monomers: hydroxyethyl (meth)acrylate, hydroxypropyl (meth)acrylate, polyhydroxypropyl (meth)acrylate, glycidyl methacrylate, (meth)acrylic acid, maleic acid, fumaric acid, itaconic acid and the monoesters of the latter three, dimethylaminoneopentyl (meth)acrylate, dimethylaminopropyl (meth)acrylamide, dimethylaminoethyl (meth)acrylate, 2-N-morpholinoethyl (meth)acrylate, tert.-butylaminoethyl (meth)acrylate, (meth)acrylamide, N-methylol (meth)acrylamide, trimethylethylammonium acrylate chloride, benzyldimethylethylammonium methacrylate chloride, trimethylneopentylammonium acrylate methylsulfate, acrylamidopropyltrimethylammonium chloride and diallyldimethylammonium chloride.

In the case of aqueous dispersions of dispersion polymers according to the invention which contain monomer units containing functional groups, it may be advantageous to use surface-active compounds (emulsifiers) and/or protective colloids for stabilization thereof. The concentration of such auxiliaries may preferably be 0 to 20% by weight, in particular 0.1 to 7% by weight, in the case of emulsifiers, and preferably 0 to 0.5% by weight, in particular 0.1 to 2% by weight, in the case of protective colloids, in each case based on the dispersion polymer.

The emulsifiers used are customary non-ionic surfactants, preferably, for example, from the group comprising the surface-active products of the reaction of aliphatic, cycloaliphatic, aralphatic, aliphatic-aromatic or aromatic carboxylic acids, alcohols, phenols or amines with epoxides, such as, for example, ethylene oxide, and block copolymers comprising various epoxides, such as, for example, ethylene oxide and propylene oxide. It is furthermore possible to use customary anionic surfactants, preferably, for example, tensioactive ammonium and alkali metal salts of fatty acids (soaps), fatty alcohol sulfates, isethionic acid ethers of fatty alcohols, alkanesulfonates, alkylbenzenesulfonates, (oxyethylated) sulfosuccinates, polyoxyethylated fatty alcohol sulfates, alkylphenol- or (alkyl) naphtholpolyoxyethylate sulfates and fatty alcohol phosphates. Suitable further emulsifiers are also, for example, customary surface-active primary, secondary and tertiary fatty amines in combination with organic or inorganic acids, and also, in addition, tensioactive quaternary alkylammonium compounds. In addition, known amphoteric surfactants having a zwitterionic structure, for example of the betaine type, such as, for example, alkylamidopropylbetaines, may be advantageous in some cases. The emulsifiers mentioned may be used in a customary manner either individually or, if they are compatible with one another, in combination with one another.

If appropriate, it is also possible to co-use customary protective colloids in the dispersions, preferably those based on high-molecular-weight organic compounds carrying HO—, (R)$_2$N—, (R)$_3$ N—, HOOC— or ROOC— groups, where R can preferably denote, for example, an aliphatic radical having 1 to 8 carbon atoms, where these compounds are water-soluble or water-dispersible, at the same time develop essentially no surface activity, or no pronounced surface activity, and have a pronounced dispersion capacity. Preferred protective colloids are those having a non-ionogenic or cationic structure, such as, for example, cellulose ethers, poly(vinyl alcohols), polysaccharides and polyvinylpyrrolidones, where these compounds may preferably be substituted by amino groups, quaternary ammonium groups, carboxyl or carboxylated groups and carboxyl alkyl groups (ester groups). Quarternary ammonium groups may be introduced into the basic macromolecules, for example, by substitution using cationization reagents, such as, for example, glycidyltrimethylammonium chloride. Cationic poly(vinyl alcohols) may also be obtained, for example, by hydrolysis of appropriate vinyl acetate copolymers containing amino and-/or ammonium groups. The amounts of protective colloid to be used depend on the dispersion properties desired, in particular on how finely divided the dispersion particles are to be. Relatively large amounts or protective colloid generally mean that the dispersions are not very finely divided.

For the preparation of dispersion polymers according to the invention, the polymerization or copolymerization can be initiated by any free-radical chain-initiating systems which are customary in emulsion polymerization and are preferably water-soluble, such as azo compounds (azoisobutyronitrile), peroxides (for example benzoyl peroxide), peresters (tert.-butyl peracetate) or percarbonates (dicyclohexylperoxydicarbonate), which may also be of an anionic nature. Preferred initiators are water-soluble compounds, such as, for example, 2,2'-azobis(2-amidinopropane) dihydrochloride, 2,2'-azobis(N,N'-dimethyleneisobutyramidine) dihydrochloride, 4,4'-azobis(4-cyanovaleric acid), H$_2$O$_2$, tert.-butyl hydroperoxide, persulfates, such as ammonium persulfate, sodium persulfate and potassium persulfate, Redox systems, such as H$_2$O$_2$ and ascorbic acid, peroxides and polyvalent metal salts, tert.-butyl hydroperoxide and Rongalit, where Redox systems may be advantageous, in particular, for reducing the residual monomer content in the post-reaction phase of the polymerization, furthermore high-energy radiation and customary photoinitiators.

In order to control the molecular weight during the emulsion, suspension or bead polymerization, it is also possible to use customary regulators, such as, for example, mercaptans or halogenated hydrocarbons in order to reduce the molecular weight, or alternatively, if appropriate up to 5% by weight, based on the total amount of monomer, of ethylenically polyunsaturated or polyfunctional compounds which are capable of crosslinking, such as, for example, divinylbenzene, ethylene glycol dimethacrylate, ethylene glycol diacrylate, butanediol dimethacrylate, butanediol diacrylate, triallyl cyanurate, melamine or isocyanatoethyl methacrylate, for increasing the molecular weight.

The preparation of dispersion polymers according to the invention can preferably take place by known processes of emulsion polymerization initiated by free radicals (batch, pre-emulsion or metering processes), if appropriate with co-use of emulsifiers, protective colloids, dispersants, molecular weight regulators and pH regulators, it being possible to obtain aqueous dispersions with dispersion polymer solid contents of, preferably 10 to 70% by weight, in particular 20 to 55% by weight, based on the dispersion. It is also possible to produce lower or higher solids contents in the dispersions by customary methods. The pH of the aqueous dispersions is usually in the range 3–9, preferably 4 to 8.5. Isolation of the dispersion polymers, preferably in powder form, from the dispersion is also possible by customary methods, preferably, for example, by spray drying or by mixing the dispersion with liquid precipitants by customary methods.

Suitable solvents for anhydrous dispersion polymers according to the invention are, for example, aliphatic and, preferably, aromatic hydrocarbons, higher alcanols, ethers containing higher alkyl radicals and cyclic ethers, such as tetrahydrofuran and dioxane, furthermore ketones and esters.

It is in principle also possible, for example, to prepare polymers of the type of the dispersion polymers according to the invention by solution polymerization, initiated by free radicals, in organic solvents and to emulsify the resultant organic polymer solutions in water with addition of emulsifier, subsequently to remove the organic solvent by distillation and thereby to obtain aqueous polymer dispersions. However, this route is complex and in some cases environmentally polluting, in contrast to the preferred emulsion, suspension or bead polymerization in aqueous medium.

In the case of emulsion polymerization for the preparation of dispersion polymers according to the invention, the customary and preferred procedure is to initially introduce in the aqueous phase, part of the monomer or monomers of the formula I to be used, either alone or mixed with other known monomers which are capable of copolymerization, to initiate the polymerization by means of free radicals, and to meter the remainder of the monomers or monomer mixture into the polymerization reactor while stirring and while maintaining the polymerization temperature necessary in the range 20° to 100° C., preferably 40° to 90° C., if appropriate in pre-emulsified form, over the course of 1 to 8 hours. In some cases, it may also be advantageous to initially introduce all the monomer and the aqueous phase into the polymerization reactor and to carry out the polymerization reaction in the form of a batch.

The dispersion polymers according to the invention may be used very advantageously for a number of different fields of application, both in the solid phase and in the form of their aqueous dispersions or dissolved in organic solvents. The products are preferably used according to the invention as coating compositions for solid substrates, as starting materials for the production of films, foils, fibers, adhesives, surface coatings, compression molding compositions and moldings, as thickeners in aqueous formulations and as impregnating agents for porous substrates, furthermore preferably also as auxiliaries for bonding leather, textiles and paper, as binders in the manufacture of fibrous leather, in papermaking, in paper finishing and in textile impregnation, and also in the construction industry as binders in the production of concrete, mortar, plaster and paints.

The invention is described in greater detail by the examples below.

EXAMPLE 1

410 g of demineralized water and 7.5 g of a 50% strength aqueous solution of sodium lauryl polyglycol ether sulfate (emulsifier) are introduced into a 2 l 3-neck flask equipped with stirrer, dropping funnel and reflux condenser. An emulsion is produced from 480 g of demineralized water, 15 g of 50% strength aqueous sodium lauryl polyglycol ether sulfate solution, 22.5 g of acrylic acid, 750 g of octyl 2-methacryloylethylcarbamate, 18 g of allyl acetoacetate and 3.4 g of ammonium persulfate (APS). 30 g of this monomer emulsion are added to the initially introduced aqueous emulsifier solution, and the flask is warmed to 80° C. while stirring. The polymerization is initiated by adding 0.35 g of APS to the flask at 55°-60° C., and the remainder of the monomer emulsion is metered in over the course of 3.5 hours at 80° C. while stirring. After a post-reaction phase of 2.5 hours, the reaction mixture is cooled to room temperature (RT). One hour after completion of the metered addition of monomer emulsion, 15 ml of 17% strength ammonia are added to the reaction mixture, and further 17% strength ammonia is added after cooling to RT in order to adjust the pH of the resultant dispersion to 8.5. A dispersion having a solid content of 41.4% by weight is obtained.

EXAMPLE 2

A dispersion is produced in corresponding manner to Example 1, but Example 1 is modified by replacing the 750 g of octyl 2-methacryloylethyl-carbamate by only 450 g of this monomeric urethane and additionally using 155 g of methyl methacrylate and 145 g of butyl acrylate. The resultant dispersion adjusted to pH 8.5 has a solids content of 43.9% by weight.

EXAMPLE 3

206.9 g of demineralized water and 1.9 g of sodium lauryl polyglycol ether sulfate are introduced into a stirred apparatus as described in Example 1. An emulsion is produced from 173.1 g of methyl methacrylate, 183.1 g of butyl acrylate, 18.75 g of octyl 2-methacryloylethylcarbamate, 11.25 g of acrylic acid, 9 g of ally acetoacetate, 0.95 g of ammonium persulfate, (AOS), 3.75 g of sodium lauryl polyglycol ether sulfate and 243.73 g of demineralized water, and 15 g of this emulsion are added to the initially introduced aqueous emulsified solution. The flask is warmed to 80° C. while stirring, and 0.175 g of APS are added at 55°-60° C. in order to initiate the polymerization. The remainder of the monomer emulsion is metered into the flask over the course of 3.5 hours while stirring. The remainder of the emulsion polymerization is carried out analogously to Example 1. The resultant dispersion adjusted to pH 8.5 has a solids content of 44.7% by weight.

COMPARATIVE EXAMPLE 1

A dispersion is produced in corresponding manner to Example 1, with the modification that the 750 g of octyl 2-methacryloylethyl-carbamate are replaced by 750 g of a mixture of methyl methacrylate and butyl acrylate in the ratio 51:49. The resultant dispersion adjusted to pH 8.5 has a solids content of 43.9% by weight.

EXAMPLE 4

Application Tests

The dispersion polymers were tested in aqueous dispersion form as a clear coat. To this end, the dispersions of Examples 1 to 3 and of Comparative Example 1 were each applied to both surfaces of degreased, phosphated (=pickled) steel sheets using a 75 μm doctor blade, and, after film formation, surgically dried for 14 days at room temperature in air, with an adherent clear coating film of approximate thickness 35 μm resulting in each case on the test sheets. The test sheets coated in this way were subsequently subjected to a salt-spray test in accordance with DIN 53167 in order to test the corrosion-protection action of the dispersion polymer films on the steel sheet. The result is reproduced in summary in Table 1 and shows the experimentally determined corrosion behavior of coated steel test specimens and the surprisingly good corrosion-protection action of the clear coats of the dispersion polymers according to the invention of Examples 1 to 3, compared with the result using the clear coat of the customary dispersion polymer of Comparative Example 1. In the latter experiment result, the steel test specimen had been completely destroyed by rust after only 144 hours exposure to salt spray, while only slight corrosion was observed, even after 240 hours exposure to salt spray, in the case of the test specimens coated with the clear coats according to the invention of Examples 1 to 3.

TABLE 1

Corrosion behavior of steel test sheets coated on both sides with clear coat films (approximately 35 μm thick) in the salt spray test in accordance with DIN 53167.

Corrosion assessment scores from 0 to 5 (0 = no corrosion, 5 = very great corrosion)

| Duration of salt spray test (hours) | NCB = number of corrosion blisters SCB = Size of corrosion blisters R = Rust | Corrosion assessment scores on steel test sheets with clear coat films from: | | | |
|---|---|---|---|---|---|
| | | Example 1 | Example 2 | Example 3 | Comp. Example 1 |
| 24 | NCB | 0.5 | 0 | 1 | 3 |
| | SCB | 0.5 | 0 | 1 | 0.5 |
| | R | 1 | 1 | 0.5 | 2 |
| 48 | NCB | 0.5 | 0.5 | 1 | 3.5 |

TABLE 1-continued

Corrosion behavior of steel test sheets coated on both sides with clear coat films (approximately 35 μm thick) in the salt spray test in accordance with DIN 53167.

Corrosion assessment scores from 0 to 5
(0 = no corrosion, 5 = very great corrosion)

| Duration of salt spray test (hours) | NCB = number of corrosion blisters SCB = Size of corrosion blisters R = Rust | Corrosion assessment scores on steel test sheets with clear coat films from: | | | |
|---|---|---|---|---|---|
| | | Example 1 | Example 2 | Example 3 | Comp. Example 1 |
| 72 | SCB | 0.5 | 1 | 1 | 1 |
| | R | 1 | 1 | 0.5 | 3 |
| | NCB | 0.5 | 0.5 | 1 | 5 |
| 144 | SCB | 2 | 2 | 2 | 2 |
| | R | 1 | 1 | 0.5 | 3.5 |
| | NCB | 0.5 | 1 | 2 | 5 |
| 192 | SCB | 2 | 0.5-2 | 2 | 5 |
| | R | 1 | 1 | 0.5 | 5 |
| | NCB | 0.5 | 1 | 2 | Salt spray test stopped since the steel test specimens completely destroyed by rust |
| | SCB | 2 | 0.5-2 | 2 | |
| 240 | R | 2 | 2 | 1 | |
| | NCB | 0.5 | 1 | 3 | |
| | SCB | 2 | 0.5-2 | 2 | |
| | R | 3 | 1 | 1 | |

We claim:

1. A polymer based on ethylenically unsaturated monomers and containing units of esters of ethylenically unsaturated carboxylic acids which are capable of (co)polymerization and contain urethane groups in the ester radicals, which polymer has been prepared by emulsion, suspension or bead polymerization or copolymerization, wherein it contains at least 1% by weight of monomer units comprising compounds of the formula I

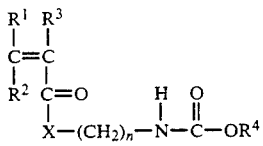

in which $R^1$ and $R^2$ may be identical or different and denote H or $CH_3$, $R^3$ denotes H or $CH_3$, X denotes O, $R^4$ denotes $(C_1-C_{22})$-alkyl, $(C_5-C_7)$-cycloalkyl which is optionally substituted by $(C_1-C_{12})$-alkyl radicals, $(C_6-C_{10})$-aryl which is optionally substituted by $(C_1-C_{12})$-alkyl radicals, aralkyl having 7 to 24 carbon atoms, heterocyclic radicals which form S- or N-containing 5-or 6-membered rings and are optionally substituted by $(C_1-C_6)$-alkyl radicals, or a β-diketo radical and n denotes a number from 2 to 4, or an aqueous dispersion of this polymer.

2. A polymer as claimed in claim 1, which contains 4 to 100% by weight of monomer units comprising compounds of the formula I and has been prepared by bead or emulsion polymerization.

3. A polymer as claimed in claim 1, which contains, in addition to the monomer units of the formula I, up to 99% by weight or up to 96% by weight of comonomer units from the group comprising customary copolymerization-capable vinyl esters, methacrylates, acrylates, vinyl aromatic compounds, acrylonitrile, ethylene or vinyl chloride.

4. A polymer as claimed in claim 1, which contains comonomer units comprising ethylenically unsaturated monomers which are capable of copolymerization and contains functional radicals from the group comprising —OH, —$SO_3H$ or salts thereof, —$N(R^5)_2$, —$N(R^6)_3$, —COOH or salts thereof, —$CON(R^7)_2$ or epoxide, where $R^5$ denotes $(C_1-C_6)$-alkyl or H, $R^6$ denotes $(C_1-C_{18})$-alkyl, $(C_7-C_{22})$-aralkyl, glycidyl, H, $(C_1-C_4)$-hydroxyalkyl, or $(C_1-C_6)$-carboxyalkyl and $R^7$ denotes $(C_1-C_6)$-alkyl, H, methylo, $(C_1-C_4)$-alkoxy, $(C_2-C_6)$-alkylsulfonic acid or salts thereof.

5. A polymer as claimed in claim 1, in the form of an aqueous dispersion whose minimum film-formation temperature (MFT) is in the range 0° to 80° C.

* * * * *